(12) United States Patent
Milley et al.

(10) Patent No.: US 11,178,003 B2
(45) Date of Patent: Nov. 16, 2021

(54) RESETTING OBSERVABLE CHANNEL KNOCKOUTS

(71) Applicant: Cox Communications, Inc., Sandy Springs, GA (US)

(72) Inventors: Andrew Milley, Roswell, GA (US); David Norman, Houston, TX (US); Brad Pfaff, Sandy Springs, GA (US); James Thompson, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 88 days.

(21) Appl. No.: 16/660,605

(22) Filed: Oct. 22, 2019

(65) Prior Publication Data
US 2021/0119856 A1   Apr. 22, 2021

(51) Int. Cl.
*H04L 12/24* (2006.01)
*H04L 12/26* (2006.01)
*H04L 12/28* (2006.01)

(52) U.S. Cl.
CPC ...... *H04L 41/0672* (2013.01); *H04L 12/2865* (2013.01); *H04L 12/2898* (2013.01); *H04L 41/0213* (2013.01); *H04L 43/0811* (2013.01); *H04L 43/10* (2013.01); *H04L 12/2861* (2013.01)

(58) Field of Classification Search
CPC . H04L 41/0672; H04L 41/0213; H04L 43/10; H04L 43/0811; H04L 12/2865; H04L 12/2898; H04L 12/2861; H04L 41/0654; H04L 12/2863
See application file for complete search history.

(56) References Cited

U.S. PATENT DOCUMENTS

| | | | | |
|---|---|---|---|---|
| 6,588,016 | B1* | 7/2003 | Chen | H04L 41/0677 348/E7.07 |
| 6,886,180 | B1* | 4/2005 | Sandberg | H04N 7/17309 348/E7.07 |
| 9,077,760 | B2* | 7/2015 | McKeown | H04L 29/06 |
| 2003/0012223 | A1* | 1/2003 | Chappell | H04L 41/0896 370/468 |
| 2003/0145075 | A1* | 7/2003 | Weaver | H04B 3/46 709/223 |
| 2008/0018427 | A1* | 1/2008 | Ezra | H04L 1/22 340/7.32 |
| 2013/0051443 | A1* | 2/2013 | Pantelias | H04L 12/2898 375/222 |
| 2013/0128723 | A1* | 5/2013 | Thibeault | H04L 12/287 370/225 |

* cited by examiner

*Primary Examiner* — Afshawn M Towfighi
(74) *Attorney, Agent, or Firm* — Eversheds Sutherland (US) LLP (57) ABSTRACT

This disclosure describes systems, methods, and devices related to resetting observable channel knockouts. A device may transmit a poll request frame to a cable modem to solicit information associated with the cable modem. The device may receive a response frame from the cable modem, wherein the response frame includes information indicating the cable modem is in a partial operation state. The device may store at least a portion of the information in the memory. The device may determine a command configured to cause the cable modem to transition from the partial operation state. The device may transmit the command to the cable modem.

20 Claims, 4 Drawing Sheets

RESETTING OBSERVABLE CHANNEL KNOCKOUTS

TECHNICAL FIELD

This disclosure generally relates to systems, methods, and devices for cable networks and, more particularly, resetting observable channel knockouts.

BACKGROUND

Generally, access to the Internet is provided to users through cable modems. That is, a user may deploy a cable modem at their residence such that the cable modem connects to a cable network. The cable modem will ultimately connect to a cable modem termination system (CMTS), which is part of a cable network facility. Based on the connection between the cable modem and the CMTS, a user may utilize a certain bandwidth to access the Internet or other services to upload and download content to their devices.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Example embodiments described herein provide certain systems, methods, and devices, for resetting observable channel knockouts.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

Historically, a cable modem used to be able to be bonded to a single upstream channel and a single downstream channel. In that case, the cable modem would get information on a downstream channel from the CMTS to the cable modem and would send information on the upstream channel from the cable modem to the CMTS. With the advent of newer versions of cable technologies using standards such as DOCSIS 3.0 and above, multiple channels can be bonded between the cable modem and the CMTS. That is, it is possible to have multiple upstream channels and multiple downstream channels that could be bonded between a cable modem and a CMTS. This results in higher bandwidth. This also allows for partial service mode where in case one of the channels experiences an impairment, a user may still be able to use the rest of the bonded channels in order to upload and/or download content to their devices. The cable modem and the CMTS would need to negotiate and transition away from using a channel that is experiencing the impairment to a channel that is operational. In that case, a user may lose some of their total available bandwidth but may still be capable of utilizing or otherwise accessing the Internet. This is a resiliency measure against impairments that allows cable modems to continue to operate at a partial state despite the impairment experience on one or more channels.

In the case where the newer versions of cable technologies are used, it is imperative that cable modems in partial state modes are minimized. Debugging and determining why newer versions of the cable technologies experience the higher partial state modes may take a long time and be a resource-intensive endeavor.

In one or more embodiments, a resetting observable channel knockouts system may facilitate identifying one or more cable modems experiencing partial state modes. The resetting observable channel knockouts system may facilitate correcting the identified one or more cable modems that are experiencing partial state modes by applying mechanisms discussed in the present disclosure.

In one or more embodiments, a resetting observable channel knockouts system may facilitate polling one or more cable modems to determine which state they are in. The resetting observable channel knockouts system may store the polled one or more cable modems that are in a partial state mode in a table in a memory. The resetting observable channel knockouts system may facilitate determining a course of action either on the cable modem side or the CMTS side in order to restore the cable modems that are identified to be in a partial state mode.

In one or more embodiments, a resetting observable channel knockouts system may facilitate implementing one or more actions on the CMTS that result in reinitializing the bonding configuration between a cable modem and the CMTS. The one or more actions may be initiated at a predetermined time of the maintenance window in order to minimize the impact on users since a partial state mode indicates that a cable modem is partially operational.

In one or more embodiments, a resetting observable channel knockouts system may be configured to identify a cable modem in partial state mode based on a polling mechanism that runs and sweeps through a list of one or more cable modems on the system. The polling mechanism may be configured to retrieve a list of all the cable modems identified by the CMTS that are connected to the CMTS. The polling mechanism may be configured to use a protocol such as simple network management protocol (SNMP) in order to poll each of the identified cable modems. The polling mechanism may be configured to retrieve information associated with a cable modem using this polling mechanism. Such information may include identification information, software information, firmware information, counters, logs, a list of channels that modem is bonded to, (e.g., upstream and downstream), or any other information associated with the cable modem. In one more embodiments, a resetting observable channel knockouts system may utilize a polling mechanism that may be configured to retrieve information associated with the CMTS. In one or more embodiments, a resetting observable channel knockouts system may combine the information associated with the cable modem that has been polled and the information associated with the CMTS that has been polled.

In one or more embodiments a cable modem is identified as being in a partial state based on a condition between the cable modem and CMTS. For example, when a proper communication exists between the cable modem and the CMTS, such that in case of a channel experiencing degradation, the CMTS may indicate to the cable modem that there exists a channel that is not operational and that the cable modem should cease or refrain from using that channel until the problem is resolved. In this case, the channel would be flagged as being in a partial state mode, which then would be identified in the cable modem as a channel that requires some action to remove it from the partial state mode. In case the CMTS is unaware of the problem on a particular channel, there may not be an indication that this particular channel is in a partial state mode because the CMTS would communicate with the cable modem through the channels that have been bonded. However, the CMTS may continue to send information to the cable modem on this particular channel that was originally bonded with the cable modem. Therefore, the cable modem and ultimately the user may be missing data that it may be expecting. In the case of Internet data, the problem may be internally remedied by the cable modem because the cable modem is capable of requesting missing data because of dropped packets. However, this results in a degraded performance because the cable modem may be increasing the requests of missing data. Even more, in the case of voice or video data, where the data is in real-time, the CMTS and the cable modem may not be able to remedy missing data and hence the user may experience even more degraded performance.

In one or more embodiments, a resetting observable channel knockouts system may determine, based on historical data of a channel, whether a channel is in a partial state mode. For example, in case historic data indicates that a cable modem has had a full allotment of channels in the past but now has less than that bonded with the CMTS, a resetting observable channel knockouts system may determine that at least one of the allotted channels is in a partial state mode.

In another embodiment, a channel may be determined to be in a partial state mode based at least in part on its performance. For example, if a cable modem is bonded to a channel and the CMTS considers that channel to be operational, however, the performance of that channel is significantly degraded on its performance, a resetting observable channel knockouts system may determine that this channel is in a partial state mode. For example, a given channel on the downstream path is measured based on the DOCSIS specification should be seeing a receive power between −15 and +15 decibel millivolts. Once a channel is performing significantly outside that threshold, such as below −25 decibel millivolts, a channel may be considered to be performing in a degraded matter. In any of the above cases of a channel being in a partial state mode, a user may be impacted by not being able to utilize his or her allocated bandwidth for their home. Therefore, users may experience slower speeds resulting in undesirable user experience.

In one or more embodiments, a resetting observable channel knockouts system may facilitate sending a command to a cable modem based on determining the modem is in a partial state mode. In one or more embodiments, the command may be a DOCSIS command such as a "Range Abort" command. The command may be sent from the CMTS to the cable modem using a sub communication channel. The command may be used by the CMTS in order to indicate to the cable modem to reinitialize all bonded channels.

Figure 1:
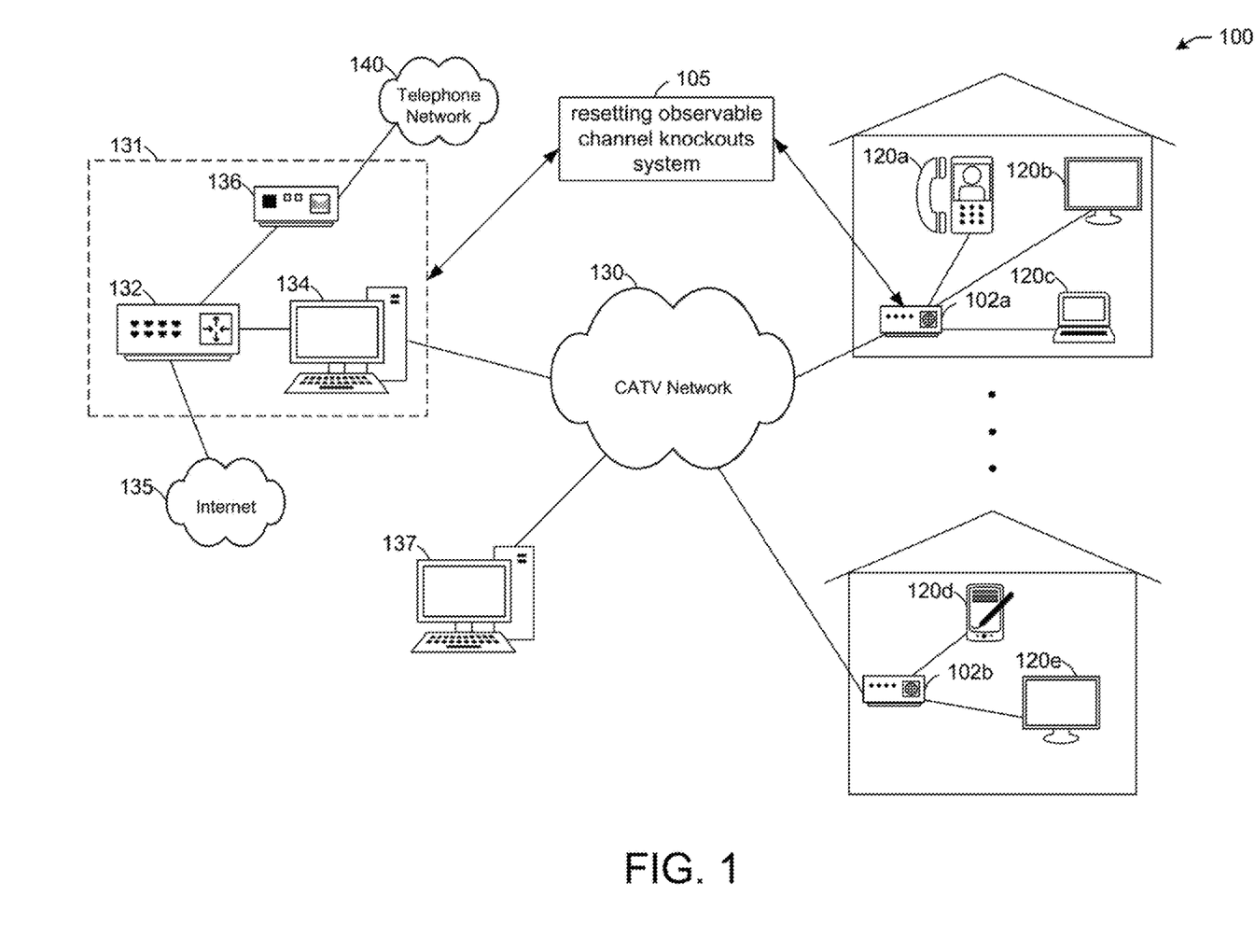
FIG. 1 depicts a diagram illustrating an example environment for techniques and structures, in accordance with one or more example embodiments of the present disclosure.

Turning now to the drawings, FIG. 1 depicts an illustrative resetting observable channel knockouts infrastructure 100, in accordance with one or more example embodiments of the present disclosure. The illustrative resetting observable channel knockouts infrastructure 100 may include various devices on a cable network, including, but not limited to routers/switches, MAC devices, access point devices, PHY devices, amplifiers, fiber nodes, and the like. For example, the illustrative resetting observable channel knockouts infrastructure 100 may include one or more households that include one or more cable modems (e.g., cable modems 102a, 102b, etc.) that may be connected to one or more user equipment. For example, cable modem 102 may be connected to user equipment 120 (e.g., user equipment 120a, 120b, and 120c) and cable modem 102b may be connected to user equipment 120 (e.g., user equipment 120d and 120e).

The cable modems may be connected to a community access television (CATV) network 130, which may include a hybrid fiber-coaxial network. The CATV network 130 provides a medium for the modems to bring Internet or other services to the households. The CATV network 130 provides upstream and downstream bandwidth per cable modem in the illustrative resetting observable channel knockouts infrastructure 100 through a cable headend 131 that may be comprised of a cable modem termination system (CMTS) 134, one or more routers/switches 132 and one more gateway devices 136.

The CMTS 134 may be connected to the Internet 135 through the one or more routers/switches 132. The CMTS 134 may also be connected to a telephone network 140 through the one or more gateway devices 136 and one or more routers/switches 132. The CATV network 130 may also be connected to a server 137 that may host information associated with the resetting observable channel knockouts infrastructure 100. A cable modem transmits data to the CMTS on multiple upstream channels simultaneously using a technique called "channel bonding." Channel bonding allows smaller bandwidth upstream channels to be bonded together to create a larger bandwidth pipe.

In one or more embodiments, the resetting observable channel knockouts system 105 may use data gathered from polling the one or more cable modems (e.g., cable modems 102a, 102b, etc.). Any cable modem that can be polled (e.g., available for communication) can respond to the CMTS 134 with telemetry indicating its state of connection. Some examples of this telemetry generated by the cable modem may include the number of channels connected between the cable modem and the CMTS 134, the modem's power level received on these channels, the signal-to-noise ratio on these channels, and a flag received from the CMTS 134 for each bonded channel to raise any alarms on these bonded channels. The flag may be contained in a frame received from the CMTS 134 such that the cable modem is able to flag the respective channel that a certain condition has occurred on the bonded channel. The flag may indicate to the cable modem that a bonded channel may be a "partial service" state. Historical telemetry is used to make a determination that a cable modem is in a state referred to as "jammed/atypical bonding," (also, "partial service") resulting in observable network impact, which may indicate that the cable modem is not fully operational. That is, based on historical data of a channel, it may be determined whether a channel is in a partial state mode. For example, in case historic data indicates that a cable modem has had a full allotment of channels in the past but now has less than that bonded with the CMTS 134, a resetting observable channel knockouts system may determine that at least one of the allotted channels is in a partial state mode.

The resetting observable channel knockouts system 105 may facilitate polling one or more cable modems to determine which state they are in. The resetting observable channel knockouts system 105 may store the polled one or more cable modems that are in a partial state mode in a table in a memory. For modems determined to be in this state, the CMTS 134 may collect identification information of those cable modems and their bonded channels in a file. The identification information may include at least the medium access control (MAC) addresses of the cable modems experiencing this state. This file may be used by the resetting the observable channel knockouts system 105 to initiate remedial actions, such as sending a "range abort" command to the MAC addresses of the cable modems in the file. The "range abort" results, at least in part, in causing a reset on the identified cable modems. After the resets have been performed, some cable modems may remain in the jammed/atypical bonding state. For a variable period, that cable modem may be exempt from further resets. The identification of these non-recovered cable modems may allow a system administrator or a network engineer to diagnose network problems easier by focusing on the channels that are found or remained in the file. Further, being in the jammed/atypical bonding state is correlated with issues that may affect the consumer. For example, the consumer may experience video tiling, garbled voice audio, or slower Internet speeds.

The resetting observable channel knockouts system may facilitate implementing one or more actions on the CMTS that result in reinitializing the bonding configuration between a cable modem and the CMTS. The one or more actions may be initiated at a predetermined time of the maintenance window in order to minimize the impact on users since a partial state mode indicates that a cable modem is partially operational.

In one or more embodiments, a resetting observable channel knockouts system may be configured to identify a cable modem in partial state mode based on a polling mechanism that runs and sweeps through a list of one or more cable modems on the system. The polling mechanism may be configured to retrieve a list of all the cable modems identified by the CMTS that are connected to the CMTS. The polling mechanism may be configured to use a protocol such as simple network management protocol (SNMP) in order to poll each of the identified cable modems. The polling mechanism may be configured to retrieve information associated with a cable modem using this polling mechanism. Such information may include identification information, software information, firmware information, counters, logs, a list of channels that modem is bonded to, (e.g., upstream and downstream), or any other information associated with the cable modem. In one more embodiments, a resetting observable channel knockouts system may utilize a polling mechanism that may be configured to retrieve information associated with the CMTS. In one or more embodiments, a resetting observable channel knockouts system may combine the information associated with the cable modem that has been polled and the information associated with the CMTS that has been polled.

In one or more embodiments a cable modem is identified as being in a partial state based on a condition between the cable modem and CMTS. For example, when a proper communication exists between the cable modem and the CMTS, such that in case of a channel experiencing degradation, the CMTS may indicate to the cable modem that there exists a channel that is not operational and that the cable modem should cease from using that channel until the problem is resolved. In this case, the channel would be flagged as being in a partial state mode, which then would be identified in the cable modem as a channel that requires some action to remove it from the partial state mode. In case the CMTS is unaware of the problem on a particular channel, there may not be an indication that this particular channel is in a partial state mode because the CMTS would communicate with the cable modem through the channels that have been bonded. However, the CMTS may continue to send information to the cable modem on this particular channel that was originally bonded with the cable modem. Therefore, the cable modem and ultimately the user may be missing data that it may be expecting. In the case of Internet data, the problem may be internally remedied by the cable modem because the cable modem is capable of requesting missing data because of dropped packets. However, this results in a degraded performance because the cable modem may be increasing the requests of missing data. Even more, in the case of voice or video data, where the data is in real-time, the CMTS and the cable modem may not be able to remedy missing data and hence the user may experience even more degraded performance.

In one or more embodiments, a resetting observable channel knockouts system may determine, based on historical data of a channel, whether a channel is in a partial state mode. For example, in case historic data indicates that a cable modem has had a full allotment of channels in the past but now has less than that bonded with the CMTS, a resetting observable channel knockouts system may determine that at least one of the allotted channels is in a partial state mode.

In another embodiment, a channel may be determined to be in a partial state mode based at least in part on its performance. For example, if a cable modem is bonded to a channel and the CMTS considers that channel to be operational, however, the performance of that channel is significantly degraded on its performance, a resetting observable channel knockouts system may determine that this channel is in a partial state mode. For example, a given channel on the downstream path is measured based on the DOCSIS specification should be seeing a receive power between −15 and +15 decibel millivolts. Once a channel is performing significantly outside that threshold, such as below −25 decibel millivolts, a channel may be considered to be performing in a degraded matter. In any of the above cases of a channel being in a partial state mode, a user may be impacted by not being able to utilize his or her allocated bandwidth for their home. Therefore, users may experience slower speeds resulting in undesirable user experience.

In one or more embodiments, a resetting observable channel knockouts system may facilitate sending a command to a cable modem based on determining the modem is in a partial state mode. In one or more embodiments, the command may be a DOCSIS command such as a "Range Abort" command. The command may be sent from the CMTS to the cable modem using a sub communication channel. The command may be used by the CMTS in order to indicate to the cable modem to reinitialize all bonded channels.

Figure 2:
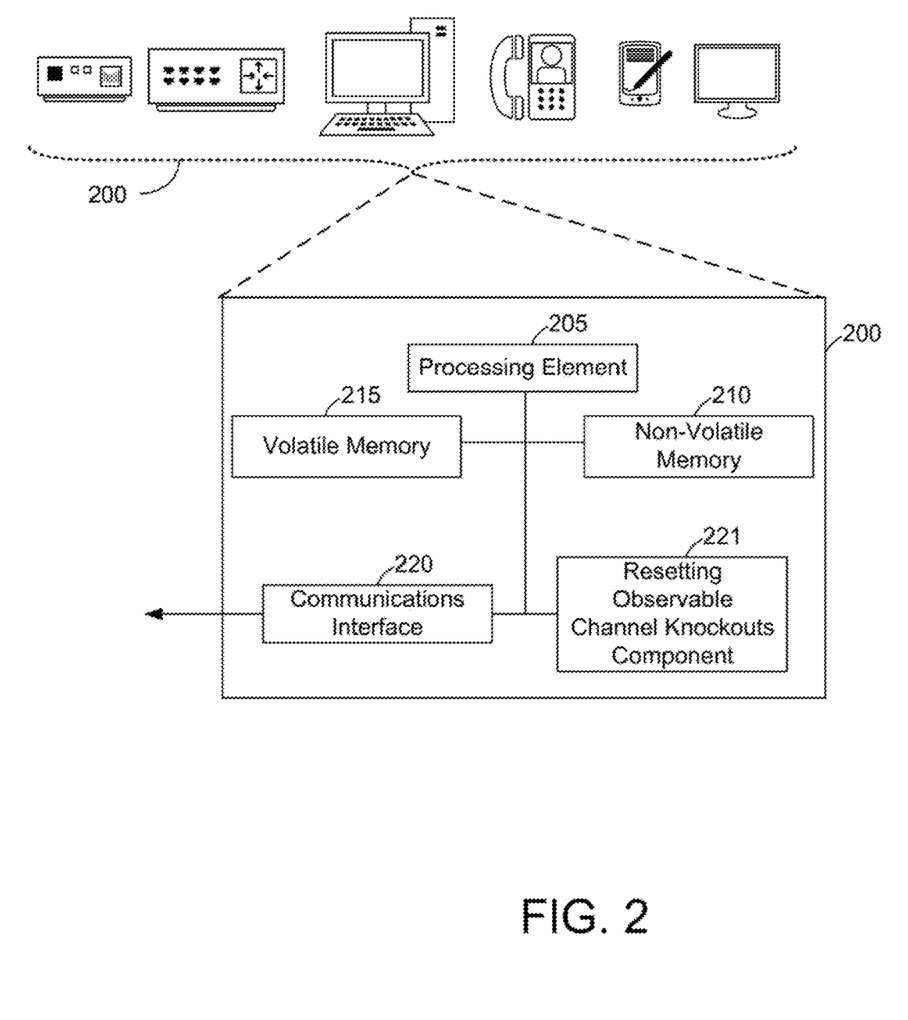
FIG. 2 depicts an illustrative schematic diagram for resetting observable channel knockouts system, in accordance with one or more example embodiments of the present disclosure.

FIG. 2 depicts an illustrative schematic diagram of a communication device 200, in accordance with one or more example embodiments of the present disclosure. The resetting observable channel knockouts infrastructure 100 may include various communication devices 200 on a cable network, including, but not limited to, a CMTS, routers/switches, cable modems, MAC devices, user equipment, access point devices, PHY devices, amplifiers, fiber nodes, and the like.

In one embodiment, FIG. 2 illustrates a functional block diagram of a communication device that may be suitable for use as a cable mode 102 (FIG. 1), a CMTS 134 (FIG. 1), a user equipment 120 (FIG. 1), or other devices that may be used in the resetting observable channel knockouts infrastructure 100, in accordance with some embodiments.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii, etc.), watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one or more embodiments, the communication device 200 may also include one or more communications interfaces 220 for communicating with various computing entities, such as by communicating data, content, information, and/or similar terms used herein interchangeably that can be transmitted, received, operated on, processed, displayed, stored, and/or the like. For instance, the communication device 200 may communicate with user equipment 120 and/or a variety of other computing entities.

In one or more embodiments, the communication device 200 may also include a resetting observable channel knockouts component 221 for implementing one or more actions on the CMTS that result in reinitializing the bonding configuration between a cable modem and the CMTS. The one or more actions may be initiated at a predetermined time of the maintenance window in order to minimize the impact on users since a partial state mode indicates that a cable modem is partially operational.

The resetting observable channel knockouts component 221 may be configured to identify a cable modem in partial state mode based on a polling mechanism that runs and sweeps through a list of one or more cable modems on the system. The polling mechanism may be configured to retrieve a list of all the cable modems identified by the CMTS that are connected to the CMTS. The polling mechanism may be configured to use a protocol such as simple network management protocol (SNMP) in order to poll each of the identified cable modems. The polling mechanism may be configured to retrieve information associated with a cable modem using this polling mechanism. Such information may include identification information, software information, firmware information, counters, logs, a list of channels that modem is bonded to, (e.g., upstream and downstream), or any other information associated with the cable modem. In one more embodiments, a resetting observable channel knockouts system may utilize a polling mechanism that may be configured to retrieve information associated with the CMTS. In one or more embodiments, a resetting observable channel knockouts system may combine the information associated with the cable modem that has been polled and the information associated with the CMTS that has been polled.

The resetting observable channel knockouts component 221 may facilitate that a cable modem is identified as being in a partial state based on a condition between the cable modem and CMTS. For example, when a proper communication exists between the cable modem and the CMTS, such that in case of a channel experiencing degradation, the CMTS may indicate to the cable modem that there exists a channel that is not operational and that the cable modem should cease from using that channel until the problem is resolved. In this case, the channel would be flagged as being in a partial state mode, which then would be identified in the cable modem as a channel that requires some action to remove it from the partial state mode. In case the CMTS is unaware of the problem on a particular channel, there may not be an indication that this particular channel is in a partial state mode because the CMTS would communicate with the cable modem through the channels that have been bonded. However, the CMTS may continue to send information to the cable modem on this particular channel that was originally bonded with the cable modem. Therefore, the cable modem and ultimately the user may be missing data that it may be expecting. In the case of Internet data, the problem may be internally remedied by the cable modem because the cable modem is capable of requesting missing data because of dropped packets. However, this results in a degraded performance because the cable modem may be increasing the requests of missing data. Even more, in the case of voice or video data, where the data is in real-time, the CMTS and the cable modem may not be able to remedy missing data and hence the user may experience even more degraded performance.

The resetting observable channel knockouts component 221 may determine, based on historical data of a channel, whether a channel is in a partial state mode. For example, in case historic data indicates that a cable modem has had a full allotment of channels in the past but now has less than that bonded with the CMTS, a resetting observable channel knockouts system may determine that at least one of the allotted channels is in a partial state mode.

The resetting observable channel knockouts component 221 may determine that a channel may be in a partial state mode based at least in part on its performance. For example, if a cable modem is bonded to a channel and the CMTS considers that channel to be operational, however, the performance of that channel is significantly degraded on its performance, a resetting observable channel knockouts system may determine that this channel is in a partial state mode. For example, a given channel on the downstream path is measured based on the DOCSIS specification should be seeing a receive power between −15 and +15 decibel millivolts. Once a channel is performing significantly outside that threshold, such as below −25 decibel millivolts, a channel may be considered to be performing in a degraded matter. In any of the above cases of a channel being in a partial state mode, a user may be impacted by not being able to utilize his or her allocated bandwidth for their home. Therefore, users may experience slower speeds resulting in undesirable user experience.

The resetting observable channel knockouts component 221 may facilitate sending a command to a cable modem based on determining the modem is in a partial state mode. In one or more embodiments, the command may be a DOCSIS command such as a "Range Abort" command. The command may be sent from the CMTS to the cable modem using a sub communication channel. The command may be used by the CMTS in order to indicate to the cable modem to reinitialize all bonded channels.

As shown in FIG. 2, in one embodiment, the communication device 200 may include one or more processing elements 205 (also referred to as processors, processing circuitry, and/or similar terms used herein interchangeably) that communicate with other elements within the communication device 200 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the communication device 200 may further include or be in communication with non-volatile media (also referred to as non-volatile memory, storage, memory storage, memory circuitry and/or similar terms used herein interchangeably). In one embodiment, the non-volatile storage or memory 215 may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the communication device 200 may further include or be in communication with volatile media (also referred to as volatile, memory, memory storage, memory circuitry and/or similar terms used herein interchangeably). In one embodiment, the volatile storage or memory 215 may also include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the communication device 200 with the assistance of the processing element 205 and operating system.

As indicated, in one embodiment, the communication device 200 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the communication device 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, ZigBee, Bluetooth protocols, wireless universal serial bus (USB) protocols, and/or any other wireless protocol.

Although not shown, the communication device 200 may include or be in communication with one or more input elements, such as a keyboard input, a mouse input, a touch screen/display input, motion input, movement input, audio input, pointing device input, joystick input, keypad input, and/or the like. The communication device 200 may also include or be in communication with one or more output elements (not shown), such as audio output, video output, screen/display output, motion output, movement output, and/or the like.

As will be appreciated, one or more components of the communication device 200 may be located remotely from other communication device 200 components, such as in a distributed system. Furthermore, one or more components of the communication device 200 may be combined and additional components performing functions described herein may be included in the communication device 200. Thus, the communication device 200 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate user equipment 120 that includes one or more components that are functionally similar to those of the communication device 200. In some embodiments, user equipment 120 may include, but not be limited to, devices associated with a customer premise equipment, as described above. In another embodiment, the user equipment 120 may be configured to receive data from an access point, or other similar devices (e.g., at a customer premise equipment site such as a home).

Figure 3:
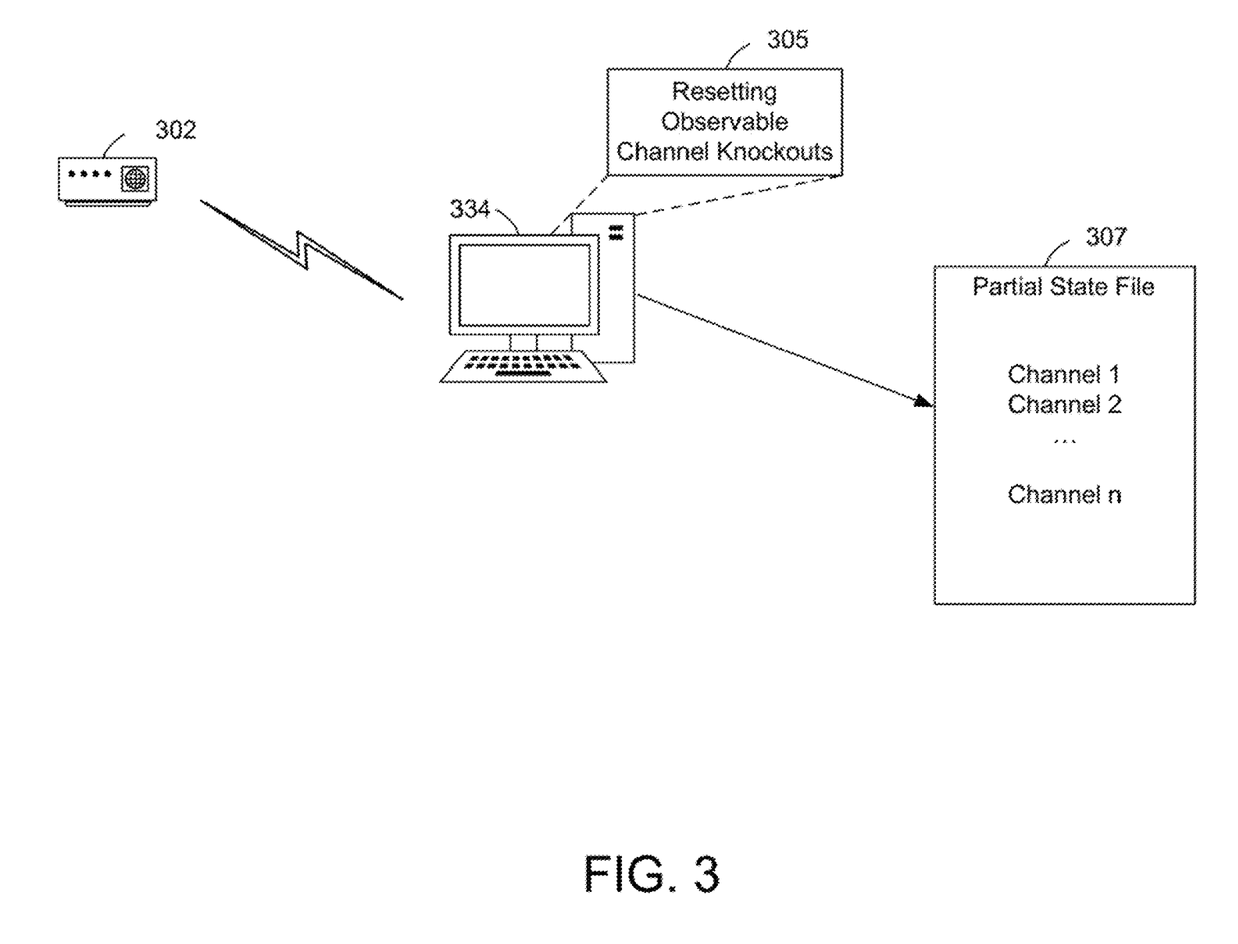
FIG. 3 depicts an illustrative schematic diagram for resetting observable channel knockouts system, in accordance with one or more example embodiments of the present disclosure.

FIG. 3 depicts an illustrative schematic diagram for resetting observable channel knockouts system, in accordance with one or more example embodiments of the present disclosure.

Referring to FIG. 3, there is shown a CMTS 334 that is in communication with one or more cable modems 302. The CMTS 334 may comprise a resetting observable channel knockouts device 305.

The resetting observable channel knockouts device 305 may facilitate polling one or more cable modems (e.g., one or more cable modems 302) to determine which state they are in. The resetting observable channel knockouts device 305 may store the polled one or more cable modems that are in a partial state mode in a table in a memory. For modems determined to be in this state, the CMTS 334 may collect identification information of those cable modems and their bonded channels in a file (e.g., partial state file 307). The identification information may include at least the medium access control (MAC) addresses of the cable modems experiencing this state (e.g., channel 1, channel 2, . . . , channel n, where n is a positive integer). This file may be used by the resetting observable channel knockouts device 305 to initiate remedial actions, such as sending a "range abort" command to the MAC addresses of the cable modems in the file. The "range abort" results, at least in part, in causing a reset on the identified cable modems. After the resets have been performed, some cable modems may remain in the jammed/atypical bonding state. For a variable period, that cable modem (e.g., cable modem 302) may be exempt from further resets. The identification of these non-recovered cable modems may allow a system administrator or a network engineer to diagnose network problems easier by focusing on the channels that are found or remained in the file. Further, being in the jammed/atypical bonding state is correlated with issues that may affect the consumer. For example the consumer may experience video tiling, garbled voice audio, or slower Internet speeds.

In one or more embodiments, the resetting observable channel knockouts device 305 may implement one or more actions on the CMTS 334 that result in reinitializing the bonding configuration between a cable modem (e.g., cable modem 302) and the CMTS 334. The one or more actions may be initiated at a predetermined time of the maintenance window in order to minimize the impact on users since a partial state mode indicates that a cable modem is partially operational.

The resetting observable channel knockouts device 305 may be configured to identify a cable modem (e.g., cable modem 302) in partial state mode based on a polling mechanism that runs and sweeps through a list of one or more cable modems on the system. The polling mechanism may be configured to retrieve a list of all the cable modems identified by the CMTS that are connected to the CMTS. The polling mechanism may be configured to use a protocol such as SNMP in order to poll each of the identified cable modems. The polling mechanism may be configured to retrieve information associated with a cable modem using this polling mechanism. Such information may include identification information, software information, firmware information, counters, logs, a list of channels that modem is bonded to, (e.g., upstream and downstream), or any other information associated with the cable modem. In one more embodiments, a resetting observable channel knockouts device 305 may utilize a polling mechanism that may be configured to retrieve information associated with the CMTS 334. In one or more embodiments, a resetting observable channel knockouts device 305 may combine the information associated with the cable modem that has been polled and the information associated with the CMTS 334 that has been polled.

The resetting observable channel knockouts device 305 may facilitate that the cable modem 302 is identified as being in a partial state based on a condition between the cable modem and CMTS 334. For example, when a proper communication exists between the cable modem 302 and the CMTS 334, such that in case of a channel experiencing degradation, the CMTS 334 may indicate to the cable modem 302 that there exists a channel that is not operational and that the cable modem should cease from using that channel until the problem is resolved. In this case, the channel would be flagged as being in a partial state mode, which then would be identified in the cable modem as a channel that requires some action to remove it from the partial state mode. In case the CMTS 334 is unaware of the problem on a particular channel, there may not be an indication that this particular channel is in a partial state mode because the CMTS 334 would communicate with the cable modem through the channels that have been bonded. However, the CMTS 334 may continue to send information to the cable modem 302 on this particular channel that was originally bonded with the cable modem 302. Therefore, the cable modem 302 and ultimately the user may be missing data that it may be expecting. In the case of Internet data, the problem may be internally remedied by the cable modem 302 because the cable modem 302 is capable of requesting missing data because of dropped packets. However, this results in a degraded performance because the cable modem 302 may be increasing the requests of missing data. Even more, in the case of voice or video data, where the data is in real-time, the CMTS 334 and the cable modem 302 may not be able to remedy missing data and hence the user may experience even more degraded performance.

The resetting observable channel knockouts device 305 may determine, based on historical data of a channel, whether a channel is in a partial state mode. For example, in case historic data indicates that a cable modem 302 has had a full allotment of channels in the past but now has less than that bonded with the CMTS 334, a resetting observable channel knockouts device 305 may determine that at least one of the allotted channels is in a partial state mode.

The resetting observable channel knockouts device 305 may determine that a channel may be in a partial state mode based at least in part on its performance. For example, if a cable modem is bonded to a channel and the CMTS 334 considers that channel to be operational, however, the performance of that channel is significantly degraded on its performance, a resetting observable channel knockouts device 305 may determine that this channel is in a partial state mode. For example, a given channel on the downstream path is measured based on the DOCSIS specification should be seeing a receive power between −15 and +15 decibel millivolts. Once a channel is performing significantly outside that threshold, such as below −25 decibel millivolts, a channel may be considered to be performing in a degraded matter. In any of the above cases of a channel being in a partial state mode, a user may be impacted by not being able to utilize his or her allocated bandwidth for their home. Therefore, users may experience slower speeds resulting in undesirable user experience.

The resetting observable channel knockouts device 305 may facilitate sending a command to the cable modem 302 based on determining the modem is in a partial state mode. In one or more embodiments, the command may be a DOCSIS command such as a "Range Abort" command. The command may be sent from the CMTS 334 to the cable modem 302 using a sub communication channel. The command may be used by the CMTS 334 in order to indicate to the cable modem 302 to reinitialize all bonded channels. It is understood that the above descriptions are for purposes of illustration and are not meant to be limiting.

Figure 4:
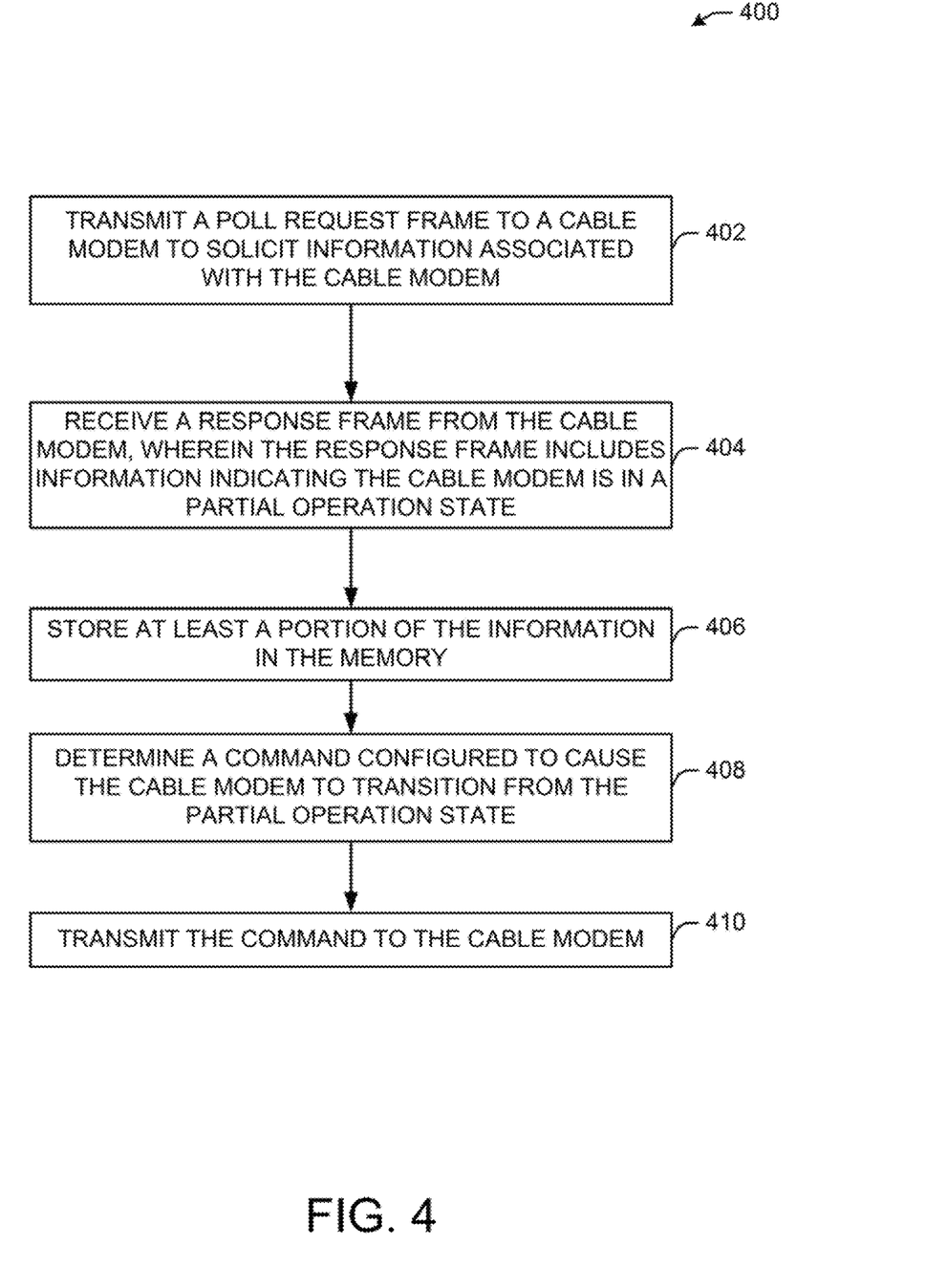
FIG. 4 depicts a flow diagram of an illustrative process for resetting observable channel knockouts system, in accordance with one or more embodiments of the disclosure.

FIG. 4 illustrates a flow diagram of illustrative process 400 for an illustrative resetting observable channel knockouts system, in accordance with one or more example embodiments of the present disclosure.

At block 402, a device (e.g., CMTS 134 of FIG. 1) may transmit a poll request frame to a cable modem to solicit information associated with the cable modem. The information comprises at least one of a flag, identification information, software information, firmware information, counter information, log information, and a list of one or more channels bonded to the one more cable modems. The poll request frame is sent using simple network management protocol (SNMP). The cable modem may be bonded to a set of channels, wherein the set of channels is associated with bandwidth. A determination may be made that a channel of the set of channels is degraded. In that case indication may be transmitted to the cable modem such that the cable modem will refrain from using the channel. A determination may be made that a second channel of the set of channels is performing below a threshold based on historical data. In that case, the device may set a flag that the second channel is in the partial state mode.

At block 404, the device may receive a response frame from the cable modem, wherein the response frame includes information indicating the cable modem is in a partial operation state.

At block 406, the device may store at least a portion of the information in the memory. The portion of the information may be stored in a table. The device may determine which state the cable modem is in. The device may then store the polled cable modem in a partial state in the table in a memory. For cable modem determined to be in this state, the device may collect identification information of that cable modem and its bonded channels in a file or document.

At block 408, the device may determine a command configured to cause the cable modem to transition from the partial operation state. The command is transmitted to the cable modem based on the table during a maintenance window. The command may be a "range abort" command associated with a channel reset operation, wherein the partial operation state is associated with at least one channel of the set of bonded channels. The file saved in memory may be used by the device to initiate remedial actions, such as sending a "range abort" command to the MAC addresses of the cable modems in the file. The "range abort" command results, at least in part, in causing a reset on the identified cable modems. After the resets have been performed, some cable modems may remain in the jammed/atypical bonding state. For a variable period, that cable modem may be exempt from further resets. The identification of these non-recovered cable modems may allow a system administrator or a network engineer to diagnose network problems easier by focusing on the channels that are found or remained in the file.

At block 410, the device may transmit the command to the cable modem. The command may be sent from the device to the cable modem using a sub communication channel. The command may be used by the device in order to indicate to the cable modem to reinitialize all bonded channels.

It is understood that the above descriptions are for purposes of illustration and are not meant to be limiting.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions is computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application-specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A device, the device comprising processing circuitry coupled to memory, the processing circuitry configured to:
   transmit a poll request frame to a cable modem to solicit information associated with the cable modem;
   receive a response frame from the cable modem, wherein the response frame includes information indicating the cable modem is in a partial operation state indicating that a first communication channel of multiple bonded communication channels is impaired and not being used by the cable modem, and in which the cable modem is using a second communication channel of the multiple bonded communication channels;

store at least a portion of the information in the memory; and determine a command configured to cause the cable modem to transition from the partial operation state to a first operation state in which the cable modem is to use the multiple bonded communication channels; and transmit the command to the cable modem.

2. The device of claim 1, wherein the portion of the information is stored in a table.

3. The device of claim 2, wherein the command is transmitted to the cable modem based on the table during a maintenance window.

4. The device of claim 1, wherein the information comprises at least one of a flag, identification information, software information, firmware information, counter information, log information, and a list of the multiple bonded communication channels.

5. The device of claim 1, wherein the poll request frame is sent using simple network management protocol (SNMP).

6. The device of claim 1, wherein the multiple bonded communication channels is associated with a bandwidth, and wherein the cable modem uses less than the bandwidth when operating in the partial operation state.

7. The device of claim 6, wherein the processing circuitry is further configured to determine the command is a range abort command associated with a channel reset operation.

8. The device of claim 6, wherein the processing circuitry is further configured to:
   determine that the first communication channel is degraded;
   transmitting an indication to the cable modem to refrain from using the first communication channel; and
   set a flag that the first communication channel is in the partial operation state.

9. The device of claim 6, wherein the processing circuitry is further configured to:
   determine that a second communication channel of the multiple bonded communication channels is performing below a threshold based on historical data; and
   set a flag that the second communication channel is in the partial operation state.

10. A non-transitory computer-readable medium storing computer-executable instructions which when executed by one or more processors result in performing operations comprising:
   transmitting a poll request frame to a cable modem to solicit information associated with the cable modem;
   receiving a response frame from the cable modem, wherein the response frame includes information indicating the cable modem is in a partial operation state indicating that a first communication channel of multiple bonded communication channels is impaired and not being used by the cable modem, and in which the cable modem is using a second communication channel of the multiple bonded communication channels;
   storing at least a portion of the information in a memory; and
   determining a command configured to cause the cable modem to transition from the partial operation state to a first operation state in which the cable modem is to use the multiple bonded communication channels; and
   transmitting the command to the cable modem.

11. The non-transitory computer-readable medium of claim 10, wherein the portion of the information is stored in a table.

12. The non-transitory computer-readable medium of claim 11, wherein the command is transmitted to the cable modem based on the table during a maintenance window.

13. The non-transitory computer-readable medium of claim 10, wherein the information comprises at least one of a flag, identification information, software information, firmware information, counter information, log information, and a list of the multiple bonded communication channels.

14. The non-transitory computer-readable medium of claim 10, wherein the multiple bonded communication channels is associated with a bandwidth, and wherein the cable modem uses less than the bandwidth when operating in the partial operation state.

15. The non-transitory computer-readable medium of claim 14, wherein the operations further comprise determining the command is a range abort command associated with a channel reset operation.

16. The non-transitory computer-readable medium of claim 14, wherein the operations further comprise:
   determining that the first communication channel is degraded;
   transmitting an indication to the cable modem to refrain from using the first communication channel; and
   setting a flag that the first communication channel is in the partial operation state.

17. A method comprising:
   transmitting, by one or more processors, a poll request frame to a cable modem to solicit information associated with the cable modem;
   receiving a response frame from the cable modem, wherein the response frame includes information indicating the cable modem is in a partial operation state indicating that a first communication channel of multiple bonded communication channels is impaired and not being used by the cable modem, and in which the cable modem is using a second communication channel of the multiple bonded communication channels;
   storing at least a portion of the information in a memory; and
   determining a command configured to cause the cable modem to transition from the partial operation state to a first operation state in which the cable modem is to use the multiple bonded communication channels; and
   transmitting the command to the cable modem.

18. The method of claim 17, wherein the information comprises at least one of a flag, identification information, software information, firmware information, counter information, log information, and a list of the multiple bonded communication channels.

19. The method of claim 17, wherein the operations further comprise determining the command is a "range abort" command associated with a channel reset operation.

20. The method of claim 19, wherein the operations further comprise:
   determining that a second communication channel of the multiple bonded communication channels is performing below a threshold based on historical data; and
   setting a flag that the second communication channel is in the partial state mode.

* * * * *